US010489324B2

(12) United States Patent
Sporck et al.

(10) Patent No.: US 10,489,324 B2
(45) Date of Patent: Nov. 26, 2019

(54) SYSTEMS AND METHODS FOR PORT MANAGEMENT

(71) Applicant: QUALCOMM Incorporated, San Diego, CA (US)

(72) Inventors: Christian Gregory Sporck, Campbell, CA (US); Georgios Konstantinos Paparrizos, Foster City, CA (US)

(73) Assignee: Qualcomm Incorporated, San Diego, CA (US)

( * ) Notice: Subject to any disclaimer, the term of this patent is extended or adjusted under 35 U.S.C. 154(b) by 161 days.

(21) Appl. No.: 15/686,357

(22) Filed: Aug. 25, 2017

(65) Prior Publication Data

US 2019/0065422 A1 Feb. 28, 2019

(51) Int. Cl.
*G06F 13/38* (2006.01)
*G06F 13/42* (2006.01)
(Continued)

(52) U.S. Cl.
CPC ........ *G06F 13/385* (2013.01); *G06F 13/4282* (2013.01); *H01R 13/7175* (2013.01);
(Continued)

(58) Field of Classification Search
CPC ........ G06F 13/385; G06F 13/38; G06F 13/42; G06F 13/364; G06F 13/40;
(Continued)

(56) References Cited

U.S. PATENT DOCUMENTS 9,378,160 B1* 6/2016 Fair .................. G06F 13/14
10,084,698 B2* 9/2018 Srivastava ............ H04L 12/10
(Continued)

FOREIGN PATENT DOCUMENTS

WO 2016037100 A1 3/2016
WO 2017083831 A1 5/2017

OTHER PUBLICATIONS

International Search Report and Written Opinion for PCT/US2018/040033, dated Sep. 27, 2018, 13 pages.
(Continued)

*Primary Examiner* — Rexford N Barnie
*Assistant Examiner* — Jagdeep S Dhillon
(74) *Attorney, Agent, or Firm* — Withrow & Terranova, PLLC (57) ABSTRACT

Systems and methods for port management are disclosed. In one aspect, the system may consolidate port management functions as well as power conversion, protection features, and signal conditioning circuitry into a single integrated circuit (IC) for a device without a battery. Further exemplary aspects allow for arbitration between ports to handle power supply versus power sink functions. Still further exemplary aspects provide an indication when a weak power source is coupled to the computing device to alert a user that the weak power source may not provide sufficient power for full operation. Such consolidated functionality allows a single form factor to be used for all ports whether the ports are used as a power port or an output port. Further, such consolidated functionality helps mitigate possible damage caused by improper activity.

9 Claims, 9 Drawing Sheets

(51) Int. Cl.
*H01R 13/717* (2006.01)
*H01R 24/62* (2011.01)
*H01R 25/00* (2006.01)
*H02J 7/00* (2006.01)
*G06F 1/26* (2006.01)
*H01R 107/00* (2006.01)

(52) U.S. Cl.
CPC ........... *H01R 24/62* (2013.01); *H01R 25/006* (2013.01); *H02J 7/0052* (2013.01); *H01R 2107/00* (2013.01); *H02J 2007/0062* (2013.01)

(58) Field of Classification Search
CPC ............. G06F 13/4081; G06F 13/4027; G06F 1/3287; G06F 1/32; G06F 1/3253; G06F 1/4022
USPC .................................. 307/24, 19, 18, 20, 17
See application file for complete search history.

(56) References Cited

U.S. PATENT DOCUMENTS

| | | | |
|---|---|---|---|
| 2002/0130638 | A1 | 9/2002 | Sherman |
| 2008/0024165 | A1* | 1/2008 | Madurawe ....... H03K 19/17736 326/41 |
| 2009/0200982 | A1 | 8/2009 | Hurtz |
| 2013/0049796 | A1* | 2/2013 | Pang ................ G01R 31/31851 326/16 |
| 2015/0357835 | A1 | 12/2015 | Naskali |
| 2016/0179648 | A1* | 6/2016 | Srivastava .......... G06F 11/3051 710/16 |
| 2016/0180632 | A1 | 6/2016 | Santana et al. |
| 2016/0283423 | A1* | 9/2016 | Srivastava ............ G06F 13/362 |
| 2016/0370835 | A1 | 12/2016 | Erickson et al. |
| 2016/0378704 | A1* | 12/2016 | Adamson ............. G06F 13/364 710/104 |
| 2017/0046289 | A1 | 2/2017 | Hundal et al. |
| 2017/0286000 | A1* | 10/2017 | Ito ......................... G11C 29/12 |
| 2018/0026711 | A1* | 1/2018 | Pruecklmayer .......... H04B 7/24 370/352 |
| 2018/0074564 | A1* | 3/2018 | Paparrizos ............. G06F 1/266 |
| 2018/0336159 | A1* | 11/2018 | Kung ................ G06F 13/4282 |
| 2018/0356873 | A1* | 12/2018 | Regupathy ............ G06F 1/3253 |

OTHER PUBLICATIONS

Author Unknown, "Universal Serial Bus Type-C Cable and Connector Specification," USB 3.0 Promoter Group, Revision 1.2, Mar. 25, 2016, 221 pages.
Co-pending U.S. Appl. No. 15/649,939, filed Jul. 14, 2017.

* cited by examiner

SYSTEMS AND METHODS FOR PORT MANAGEMENT

BACKGROUND

I. Field of the Disclosure

The technology of the disclosure relates generally to managing ports and particularly to managing Universal Serial Bus (USB) Type-C ports.

II. Background

Computing devices have not only become exceptionally common throughout contemporary society, but also have experienced a phase of renewed diversity with numerous specialized or niche computing devices now available. For example, set top boxes, smart speakers, intelligent appliances, and home security systems have all added robust processors configured to provide specialized computing functions ancillary to some originally contemplated purpose. Historically, many of these devices had a dedicated power input, which, in many cases was a barrel jack receptacle. The barrel jack typically complied with one of a small number of standard form factors and was connected to a plug through a cable so as to receive power from a wall outlet. In many instances, the plug may include a transformer to convert alternating current (AC) delivered by the wall outlet to direct current (DC). In addition to barrel jacks, some of these niche computing devices may include an additional port such as an audio or video output. Such ports may also conform to one of a variety of established form factors (e.g., 3.5 mm audio jack, HDMI, or the like).

While barrel jacks for power are well-established and known technologies, not every device is designed to receive power through a barrel jack. One alternate power delivery format is through a Universal Serial Bus (USB) port. Devices such as e-readers (e.g., the AMAZON KINDLE) may have a USB receptacle that receives a USB connector whose associated cable includes a plug for a wall outlet. While the various USB standards contemplate power delivery, USB ports are not limited to just power solutions. USB ports are also designed to convey data. The relatively recent USB Type-C port is one example of a multi-purpose port. Many of the niche computing devices are migrating to a USB Type-C port to provide a port that can be connected to myriad other computing devices for myriad other purposes. For example, a USB Type-C port may be used not just for power delivery, but also for audio and video data transfers. For example, a set top box (e.g., APPLE TV, ROKU, or the like) may include a video output such as a DisplayPort signal that is routed through a USB Type-C port. Still other devices may couple to a mobile terminal to use a modem and wireless data plan associated with the mobile terminal for content acquisition.

Given that the USB Type-C port can handle power as well as data transfers in a variety of formats, there is movement within the industry to consolidate receptacles in these niche computing devices to one or more USB Type-C ports and the elimination of the traditional barrel jack or consolidation of a micro-USB connector with secondary connector (e.g., HDMI) for audio/video. In situations where more than one USB Type-C port is available on a single device, a casual user may connect more than one such port to a respective power source, which may create a conflict between the ports. It is also possible that no particular port is coupled to a wall outlet and only one port is coupled to a weak power source (e.g., a mobile phone or laptop computer). Because most of these niche devices do not have a battery, such weak power sources may not be able to provide enough power to the device for operation. Accordingly, there is a need to be able to manage these ports in such devices to help improve the user experience and avoid port-to-port conflicts.

SUMMARY OF THE DISCLOSURE

Aspects disclosed in the detailed description include systems and methods for port management. In particular, exemplary aspects consolidate port management functions as well as power conversion, protection features, and signal conditioning circuitry into a single integrated circuit (IC) for a device without a battery. Further exemplary aspects allow for arbitration between ports to handle power supply versus power sink functions. Still further exemplary aspects provide an indication when a weak power source is coupled to the computing device to alert a user that the weak power source may not provide sufficient power for full operation. Additional functionality may also be present to interface with system components and communicate the need for those system components to take specific actions, like processor throttling, entering standby mode, reducing/increasing input power, and the like. Such consolidated functionality allows a single form factor to be used for all ports whether the ports are used as a power port or an output port. Further, such consolidated functionality helps mitigate possible damage caused by improper activity.

In this regard in one aspect, a method of controlling power for a device is disclosed. The method includes detecting insertion of a connector into a Universal Serial Bus (USB) Type-C receptacle. The method also includes determining if power is available through the USB Type-C receptacle or if power is being drawn through the USB Type-C receptacle. The method also includes negotiating power levels if power is available. The method also includes determining if other modes are supported through the USB Type-C receptacle. The method also includes controlling such other modes if available.

In another aspect, a device is disclosed. The device includes at least one USB Type-C receptacle. The device also includes a USB port control IC including circuitry. The circuitry is configured to detect insertion of a connector into a USB Type-C receptacle. The circuitry is also configured to determine if power is available through the USB Type-C receptacle or if power is being drawn through the USB Type-C receptacle. The circuitry is also configured to negotiate power levels if power is available. The circuitry is also configured to determine if other modes are supported through the USB Type-C receptacle. The circuitry is also configured to control such other modes if available.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for port management. In particular, exemplary aspects consolidate port management functions as well as power conversion, protection features, and signal conditioning circuitry into a single integrated circuit (IC) for a device without a battery. Further exemplary aspects allow for arbitration between ports to handle power supply versus power sink functions. Still further exemplary aspects provide an indication when a weak power source is coupled to the computing device to alert a user that the weak power source may not provide sufficient power for full operation. Additional functionality may also be present to interface with system components and communicate the need for those system components to take specific actions, like processor throttling, entering standby mode, reducing/increasing input power, and the like. Such consolidated functionality allows a single form factor to be used for all ports whether the ports are used as a power port or an output port. Further, such consolidated functionality helps mitigate possible damage caused by improper activity.

Figure 2:
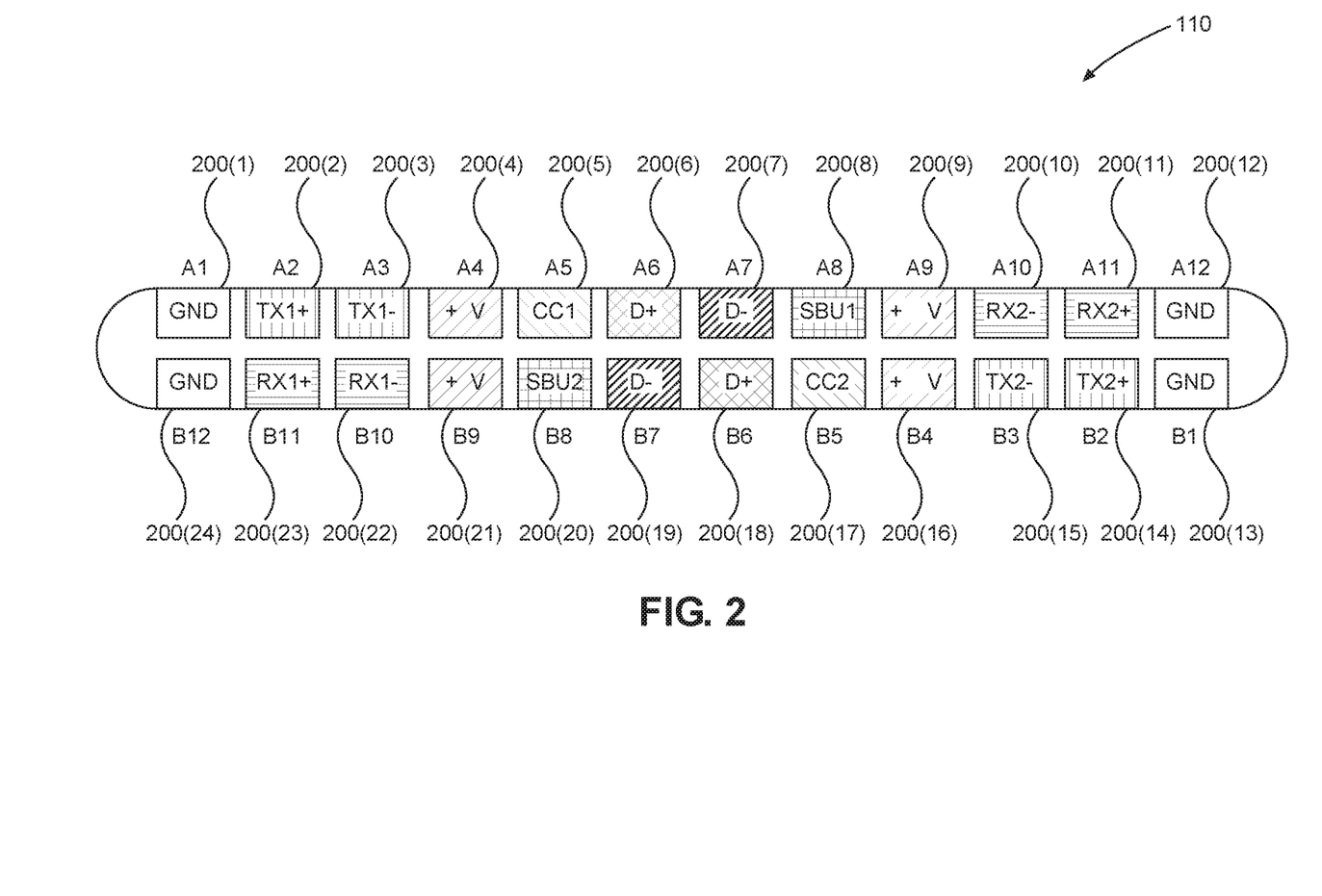
FIG. 2 is a pin layout diagram for a USB Type-C receptacle.
Figure 3:
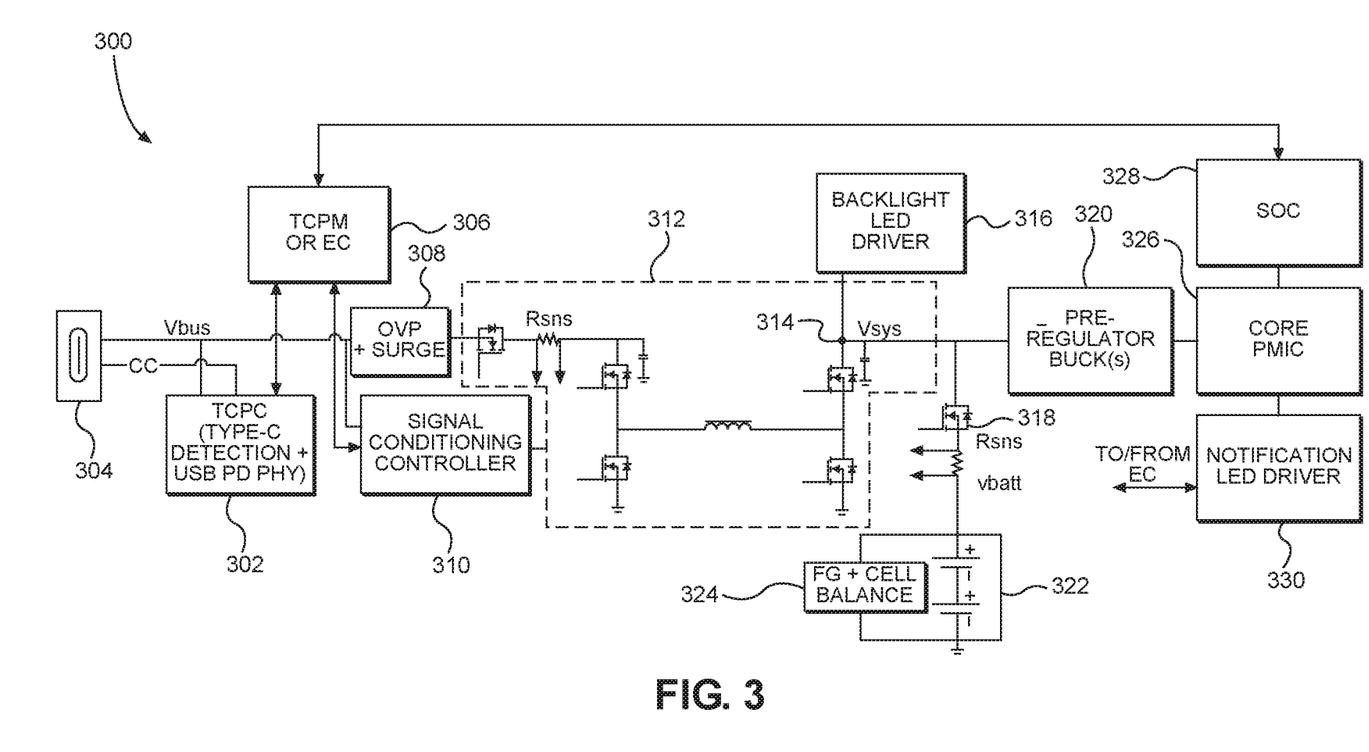
FIG. 3 is a block diagram of a conventional circuit layout for a computing system showing one USB Type-C port associated with a battery-powered system.
Figure 4:
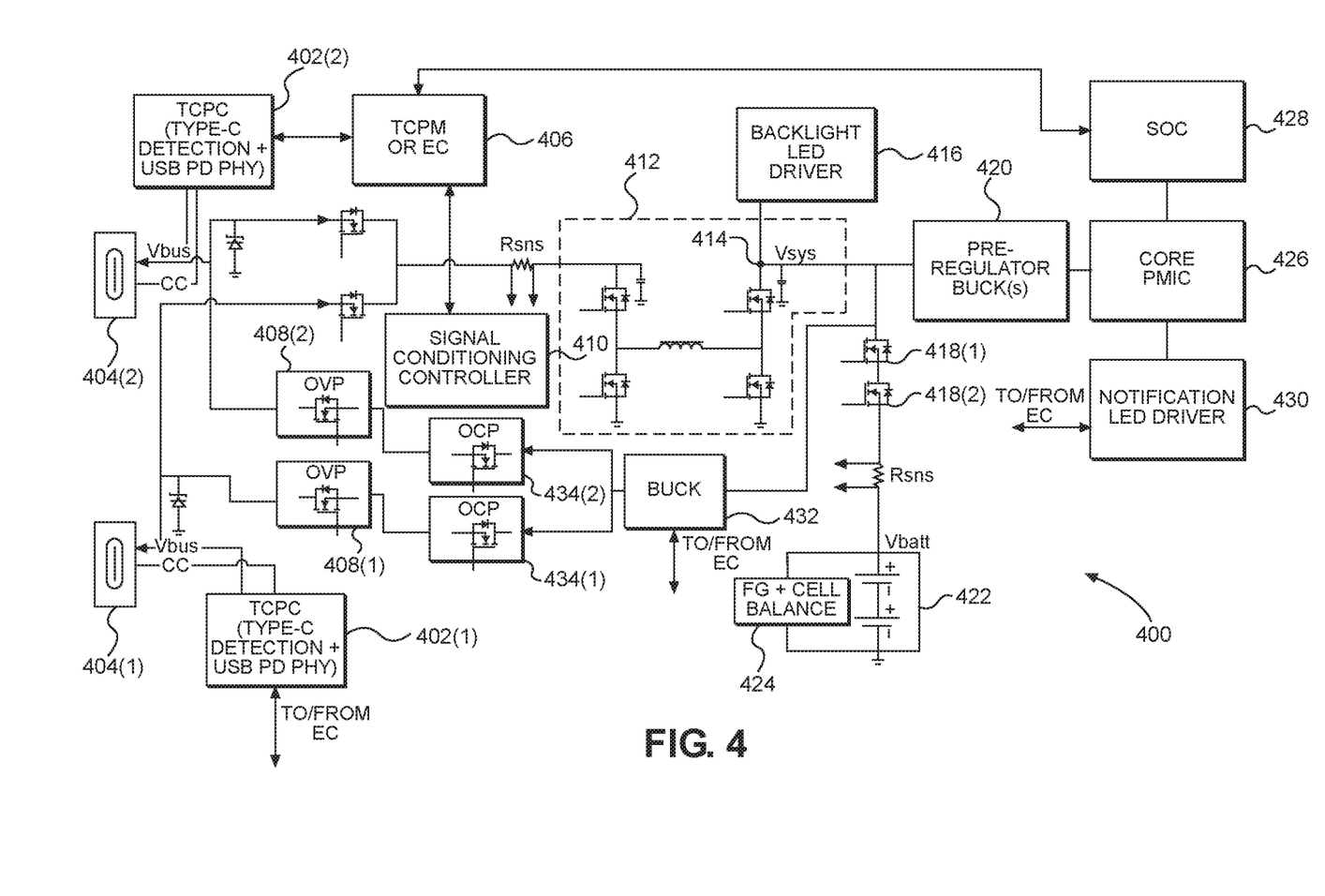
FIG. 4 is a block diagram of a conventional circuit layout for a computing system having multiple USB Type-C ports associated with a battery-powered system.

Before addressing particular details of the present disclosure, a brief overview of computing devices that may include ports, and particularly Universal Serial Bus (USB) Type-C ports, that may benefit from exemplary aspects of the present disclosure are provided. FIG. 2 provides additional details about a USB Type-C port. While the present disclosure focuses on USB Type-C, it should be appreciated that other multi-purpose ports may also benefit from exemplary aspects of the present disclosure. FIGS. 3 and 4 highlight some of the problems of a conventional multi-port battery-based computing device and a discussion of exemplary aspects of the present disclosure resumes with reference to FIG. 5.

Figure 1:
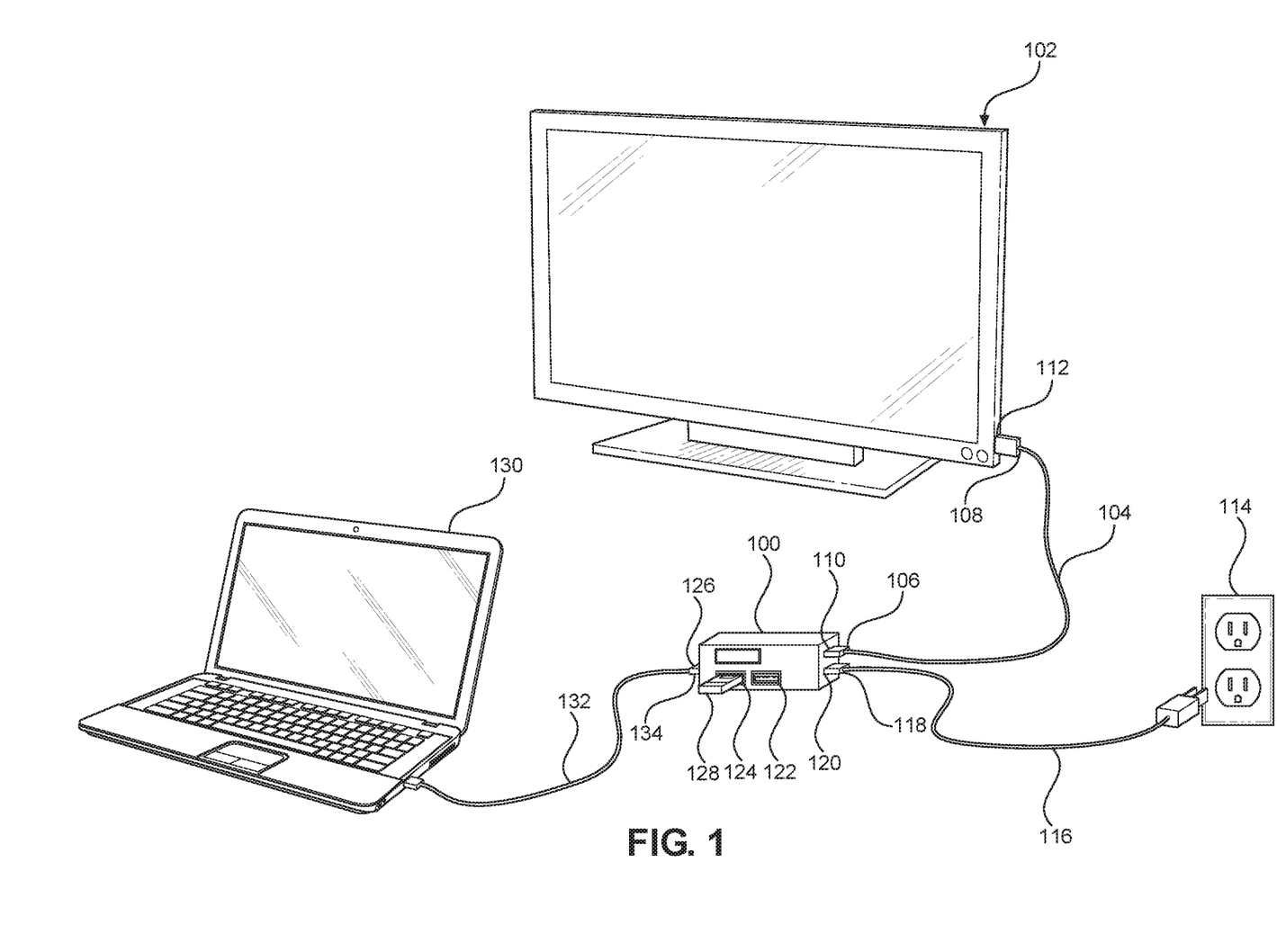
FIG. 1 is a simplified perspective view of an exemplary set top box having multiple ports and no battery.

In this regard, FIG. 1 is a simplified perspective view of a computing device 100, which as illustrated is a set top box, but as explained below, could be other sorts of computing devices. The computing device 100 is coupled in this case to a display or monitor 102 through a USB cable 104. The USB cable 104 includes connectors 106 and 108 which plug into receptacles 110 and 112, respectively, on the computing device 100 and the monitor 102. The computing device 100 does not typically have an internal battery and receives power from a wall outlet 114 through a cable 116. The cable 116 includes a connector 118 that plugs into a receptacle 120 on the computing device 100. The computing device 100 may include further receptacles 122, 124, and 126. In an exemplary aspect, the computing device 100 may access data files on a memory stick 128 that is plugged into the receptacle 124. Alternatively, the computing device 100 may access data files stored on a hard drive of a laptop computer 130 that is plugged into the receptacle 126 via a cable 132 having a connector 134. The computing device 100 may access a remote network through a wireless modem associated with the laptop computer or through comparable techniques such that the computing device 100 may download content from a remote server in the remote network (e.g., a HULU or AMAZON VIDEO or NETFLIX service).

As is readily apparent, there are plural receptacles 110, 112, 120, 122, 124, and 126 for the computing device 100. Each such receptacle may be a USB Type-C receptacle having a corresponding USB port associated therewith, which allows for video output as well as other functions through the same connector. While USB Type-C is particularly contemplated, other multi-purpose ports may also be present in addition to the USB ports or in place thereof.

The USB Type-C receptacle and connectors described herein are conventional multi-purpose receptacles and connectors as defined by the USB specification, "Universal Serial Bus Type-C Cable and Connector Specification," USB 3.0 Promoter Group, Revision 1.2, Mar. 25, 2016, 221 pages, which is herein incorporated by reference in its entirety. For convenience, the multi-purpose nature of the USB Type-C elements is further explained by reference to the pin layout of the USB Type-C receptacle with reference to FIG. 2.

In particular, FIG. 2 illustrates the pin layout for USB Type-C receptacle 110, with the understanding that other receptacles may be identical. The USB Type-C receptacle 110 includes twenty-four pins or contacts 200(1)-200(24), which have functions as assigned by the USB Type-C specification and are summarized in Table 1 below.

TABLE 1

USB TYPE-C CONNECTOR PIN CONFIGURATION

| Number | Pin | Name | Description |
|---|---|---|---|
| 200(1) | A1 | GND | Ground return |
| 200(2) | A2 | SSTXp1 | SuperSpeed differential pair #1, TX, positive |
| 200(3) | A3 | SSTXn1 | SuperSpeed differential pair #1, TX, negative |
| 200(4) | A4 | $V_{BUS}$ | Bus power |
| 200(5) | A5 | CC1 | Configuration Channel |
| 200(6) | A6 | Dp1 | USB 2.0 differential pair, position 1, positive |
| 200(7) | A7 | Dn1 | USB 2.0 differential pair, position 1, negative |
| 200(8) | A8 | SBU1 | Sideband Use (SBU) |
| 200(9) | A9 | $V_{BUS}$ | Bus power |
| 200(10) | A10 | SSRXn2 | SuperSpeed differential pair #2, RX, negative |
| 200(11) | A11 | SSXp2 | SuperSpeed differential pair #2, RX, positive |
| 200(12) | A12 | GND | Ground return |
| 200(13) | B1 | GND | Ground return |
| 200(14) | B2 | SSTXp2 | SuperSpeed differential pair #2, TX, positive |
| 200(15) | B3 | SSTXn2 | SuperSpeed differential pair #2, TX, negative |
| 200(16) | B4 | $V_{BUS}$ | Bus power |
| 200(17) | B5 | CC2 | Configuration Channel |
| 200(18) | B6 | Dp2 | USB 2.0 differential pair, position 2, positive |
| 200(19) | B7 | Dn2 | USB 2.0 differential pair, position 2, negative |
| 200(20) | B8 | SBU2 | Sideband use |
| 200(21) | B9 | $V_{BUS}$ | Bus power |
| 200(22) | B10 | SSRXn1 | SuperSpeed differential pair #1 RX, negative |
| 200(23) | B11 | SSRXp1 | SuperSpeed differential pair #1, RX, positive |
| 200(24) | B12 | GND | Ground return |

It should be appreciated that a USB connector, such as the connector 106 inserted into the receptacle 110, has complementary conductive elements. In some exemplary aspects, such conductive elements are pins, and in others, such conductive elements are contact pads. As used herein, the conductive elements of the plurality of USB Type-C receptacles 110, 112, 120, 122, 124, and 126 are referred to as pins regardless of the specific form they take. The form factor of the USB Type-C receptacle is defined in the USB Type-C specification and well understood at this point.

Each of the plurality of USB Type-C receptacles 110, 112, 120, 122, 124, and 126 is, in essence, a USB port which may, according to the USB Type-C specification, provide power (i.e., act as a power source) or consume power (i.e., act as a power sink) and may further exchange data as is well understood. To effectuate such functionality, each port needs control circuitry that performs Vbus and command and control (CC) detection (to ascertain insertion, orientation of insertion, and a resistor value associated with the inserted connector, which provides a variety of information to the computing device), a power delivery (PD) physical layer (PHY) (PD PHY), and a D+/D− detection circuit. In situations where a battery is provided, battery-related circuits are required, including an over-voltage protection circuit, a conditioning circuit such as a buck, boost, or buck-boost converter circuit, and a battery charger circuit. While over-voltage protection may be applicable in contexts outside of battery charging, for the purposes of the present disclosure, the present disclosure defines the over-voltage protection circuit as a battery-related circuit. Note that in non-battery-powered systems, the battery-related circuits are replaced by power conversion circuits which convert input voltages to voltage levels required by the system components and also limit input and/or output currents.

Conventional implementations implement these circuits as distinct ICs, which consume valuable real estate within the computing device, complicate wire routing, add general system complexity, and may have electromagnetic interference ramifications. FIGS. 3 and 4 illustrate exemplary conventional battery-based systems. The burden on designing a viable layout is not insignificant with a single USB Type-C receptacle as illustrated in FIG. 3, but even worse with even just two USB Type-C receptacles as illustrated in FIG. 4. As noted above, for non-battery-powered systems, there are similar concerns and substitute voltage and current limiting circuits.

In this regard, FIG. 3 illustrates a conventional computing system 300 that has a Type-C port controller (TCPC) 302 associated with a Type-C receptacle 304. The TCPC 302 may perform Type-C detection and have the USB PD PHY in a single IC. The TCPC 302 receives signals from Vbus pins 200(4) and 200(16) as well as from CC pins 200(5) and 200(17). The TCPC 302 may interoperate with a Type-C port manager (TCPM) 306 (sometimes referred to as an embedded controller (EC)). The signals from the Vbus pins 200(4) and 200(16) are also provided to an over-voltage protection circuit 308 and a signal conditioning controller 310. The signal conditioning controller 310 controls a signal conditioning circuit 312. The signal conditioning circuit 312 is, in an exemplary aspect, a buck-boost charger, which provides a signal at an output node 314. The over-voltage protection circuit 308 may also contain a surge protection circuit and is thus labeled OVP+Surge in the figures.

With continued reference to FIG. 3, the output node 314 is coupled to a backlight light emitting diode (LED) driver 316, which may be used to drive LEDs for screen backlight control or other LED indication, a battery field effect transistor (FET) 318, and an output pre-regulator buck circuit 320. The battery FET 318 provides power to a battery pack circuit 322, which may include a fuel gauge (sometimes shown as FG in the figures) and cell balance circuit 324. The output pre-regulator buck circuit 320 provides power to a core power management IC (PMIC) 326, which in turn provides power to a main processing circuit 328 (referred to as a system on a chip (SOC) in FIG. 3) of the computing system 300. The main processing circuit 328 communicates with the TCPM 306. In some devices, the PMIC 326 also provides a signal to a notification LED driver 330, which may be up to four channels. As illustrated, four channels is sufficient to indicate, either through dedicated indicators or through a combination of different patterns, whether a charger is present, that a battery is charging, a fault, insufficient power, a dead battery, and a hibernation mode. In certain applications the LED channels may also be used for other indications, such as battery state of charge, etc. As noted above, the battery-related circuits may be replaced by voltage conversion circuits and/or current input/output limiting circuits in devices that have no battery.

As is readily apparent, the conventional computing system 300 includes many separate ICs with commensurate interstitial elements (e.g., resistors, transistors, inductors, capacitors, and the like), wire routing, and placement challenges. These challenges are exacerbated when there is more than one USB Type-C receptacle. In this regard, FIG. 4 shows a conventional computing system 400 having two TCPCs 402(1)-402(2) and two USB Type-C receptacles 404(1)-404(2). The TCPCs 402(1)-402(2) may be separate ICs, with each one able to perform Type-C detection and having the USB PD PHY in a single IC. The TCPCs 402(1)-402(2) receive signals from the respective Vbus pins 200(4) and 200(16) as well as from the CC pins 200(5) and 200(17). The TCPCs 402(1)-402(2) may interoperate with a TCPM 406. The signals from the Vbus pins 200(4) and 200(16) are also provided to over-voltage protection circuits 408(1)-408(2) and a signal conditioning controller 410. The signal conditioning controller 410 controls a signal conditioning circuit 412. The signal conditioning circuit 412 is, in an exemplary aspect, a buck-boost charger, which provides a signal at an output node 414.

With continued reference to FIG. 4, the output node 414 is coupled to a backlight LED driver 416, a pair of battery FETs 418(1)-418(2), and an output pre-regulator buck circuit 420. Battery FET 418(2) provides power to a battery pack circuit 422, which may include a fuel gauge and cell balance circuit 424. The output pre-regulator buck circuit 420 provides power to a core PMIC 426, which in turn provides power to a main processing circuit 428 (SOC) of the computing system 400. The main processing circuit 428 communicates with the TCPM 406. In some devices, the PMIC 426 also provides a signal to a four-channel notification LED driver 430. The output node 414 may also be connected to a buck converter 432, which is coupled to two over-current protection (OCP) circuits 434(1)-434(2). When the battery pack circuit 422 has an internal ship mode, a single battery FET 418 may be sufficient. As used herein, a ship mode is a mode into which a device is placed when the device is likely to be in a warehouse or on a shelf for a long period of time and there is a desire to not discharge the battery completely. Thus, in the ship mode, the battery is disconnected from the system so that battery drain is minimal. In such instance, the only way to exit the ship mode is through the insertion of power into the device. When the battery pack circuit 422 does not have the internal ship mode, then two battery FETS are used to implement the ship mode so that battery drain is minimal. In this case, it may be possible, depending on the device, to exit the ship mode through keypad entry. It is also true that back-to-back battery FETS 418(1)-418(2) may also help with additional protection during discharging (e.g., a short circuit or the like). As noted above, the battery-related circuits may be replaced by voltage conversion circuits and/or current input/output limiting circuits in devices that have no battery.

Again, it is readily apparent that the placement, routing, and general system complexity becomes increasingly complex as the number of Type-C receptacles increases. Exemplary aspects of the present disclosure do several things to improve conditions. First, exemplary aspects consolidate at least some of the TCPC circuits and some of the battery-related circuits into a single IC. The more circuits consolidated, the greater the impact on the placement and routing concerns and the more readily scalable the solution provided. Additionally, battery FETs analogous to the battery FETs 318 and 418(1)-418(2) may be shared, eliminating the need for plural battery FETs. In still another aspect, one or more LED drivers may be consolidated into the single IC. Second, exemplary aspects of the present disclosure arbitrate between different ports to uncertain power conditions. As part of this arbitration, a single power source may be selected to provide power to the computing device. If this single power source is insufficient to provide necessary and sufficient power to the computing device, an indication may be provided to the user that functionality may be limited. Still further, this arbitration may control if the computing device is able to act as a power source through other receptacles.

Figure 5:
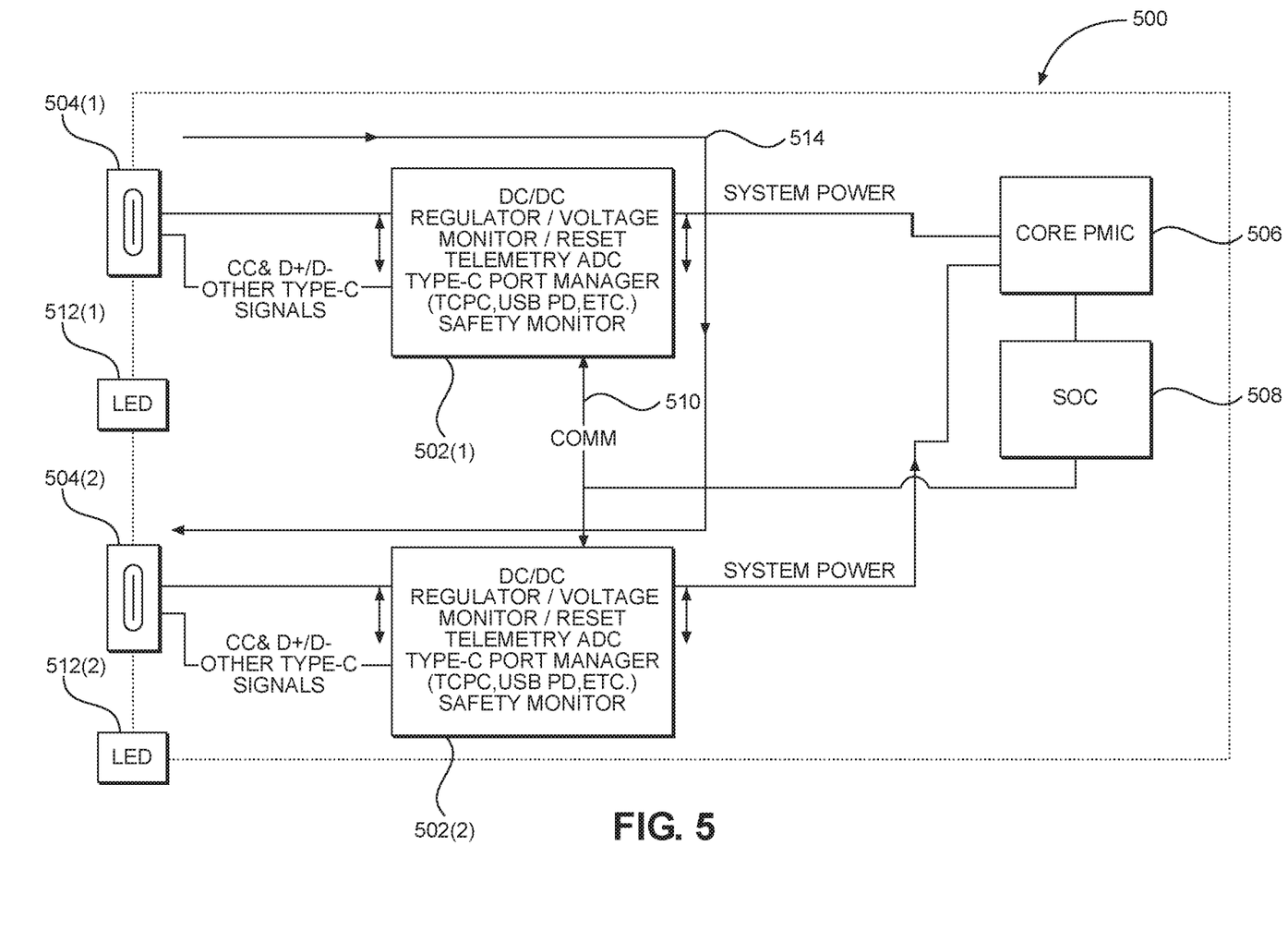
FIG. 5 is a block diagram of a consolidated integrated circuit (IC) architecture for a computing system showing two USB Type-C ports according to exemplary aspects of the present disclosure where the system is batteryless.

In this regard, FIG. 5 provides a simplified block diagram version of a batteryless device 500 analogous to the computing device 100 of FIG. 1 with consolidated port control ICs 502(1)-502(2). While only two consolidated port control ICs 502(1)-502(2) are shown, it should be appreciated that one such IC may be present for each receptacle of the device 500. The consolidated port control ICs 502(1)-502(2) may each contain a DC/DC regulator circuit, a voltage monitor and/or voltage reset circuit, a telemetry analog-to-digital converter (ADC) circuit, a TCPM circuit, a USB power delivery circuit, a safety monitor, an LED driver circuit, and the like. For more information about a possible consolidated port control IC, the interested reader is directed to U.S. patent application Ser. No. 15/649,939, filed Jul. 14, 2017 and entitled "UNIVERSAL SERIAL BUS (USB) TYPE-C AND POWER DELIVERY PORT WITH SCALABLE POWER ARCHITECTURE", which is herein incorporated by reference in its entirety.

With continued reference to FIG. 5, each consolidated port control IC 502(1)-502(2) is coupled to a respective receptacle 504(1)-504(2) and receives at least CC signals as well as D+/D− signals. Other signals may optionally be provided from the receptacle 504 to the corresponding consolidated port control IC 502. The consolidated port control ICs 502(1)-502(2) are configured to provide system power to a PMIC 506 so that SOC 508 has necessary and sufficient power to operate and enable desired functionality for the device 500. In practice, only one of the consolidated port control ICs 502(1)-502(2) provides power to the PMIC 506. To control selection of which consolidated port control IC 502(1) or 502(2) provides power to the PMIC 506, each consolidated port control IC 502(1)-502(2) may communication on a bus 510 with the other consolidated port control ICs. The SOC 508 may also be coupled to the bus 510 and may control port priority and determine which port enters power sink or power source mode (or power neutral mode). Alternatively, one of the consolidated port control ICs 502(1)-502(2) may be a master device on the bus 510 and control which port acts as a power sink or power source. It should be appreciated that the PMIC 506 may provide power to components within the device other than just the SOC 508.

With continued reference to FIG. 5, once one of the consolidated port control ICs 502(1)-502(2) is selected as a power sink to provide power to the device 500, the chosen consolidated port control IC 502 may drive an associated LED 512(1)-512(2) to indicate that power is present, that sufficient power is present, that insufficient power is present, or the like. Such indications may be made by changing the color of the LED or illuminating different sequences of a plurality of LEDs, or the like as needed or desired.

Note that exemplary aspects of the present disclosure allow for one port to be a power sink, drawing power, and another port concurrently to be a power source, so that power effectively flows from a first port to a second port (shown generally by arrow 514 in FIG. 5).

Note further that while the above discussion contemplates only one of the consolidated port control ICs 502(1)-502(2) acting as a power sink, it is possible that multiple consolidated port control ICs 502(1)-502(2) act as power sinks. Such may be appropriate when neither port provides sufficient power or when a device offers a special mode requiring higher power levels. Over-voltage protection circuitry (not shown) may be used in such situations to avoid damage to the SOC 508 or other circuitry in the device 500.

Figure 6:
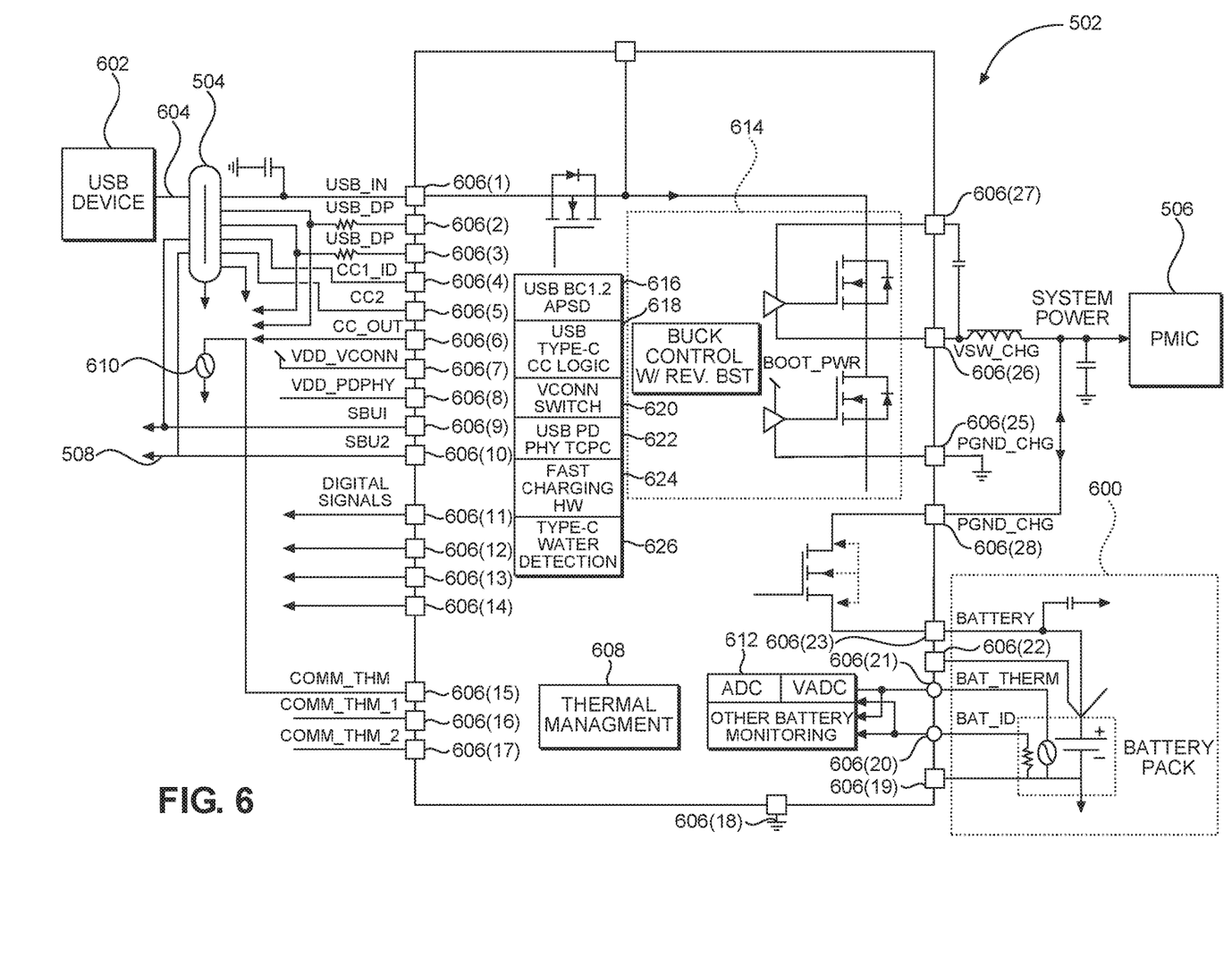
FIG. 6 is a simplified circuit diagram of a consolidated IC in situ with a more complete pin layout and associated circuitry according to exemplary aspects of the present disclosure for a device with an optional battery.

FIG. 6 provides a more detailed block diagram of a consolidated port control IC 502 coupled to a receptacle 504 and the PMIC 506. Note that while exemplary aspects of the present disclosure are well suited for operation in computing devices that do not have batteries, the present disclosure is not so limited. Thus, the consolidated port control IC 502 may be coupled to an optional battery pack 600. As illustrated, the receptacle 504 may be coupled to a USB device 602 through a cable 604. The USB device 602 may be a power source, a power sink, a wall outlet (i.e., a specific form of a power source), or the like. Some signals arriving through the receptacle 504 are routed directed to the SOC 508 (e.g., SBU1, SBU2) concurrently with provision to the consolidated port control IC 502. Other signals such as USB_IN, USB_DP (D+), USB_DN (D−), CC1_ID, and CC2 are provided to the consolidated port control IC 502 through pins 606(1)-606(5), respectively, corresponding to the equivalent pins 200 in the receptacle 504, respectively. A CC_out pin 606(6) may be provided along with a VDD_VCONN pin 606(7) and a VDD_PDPHY pin 606(8). As noted, the consolidated port control IC 502 may also receive SBU1 and SBU2 signals through pins 606(9)-606(10). LED pins 606(11)-606(14) may drive the LEDs 512(1)-512(2) of FIG. 5. A thermal management circuit 608 may be coupled to thermal pins 606(15)-606(17), one of which may couple to a thermistor 610. A ground pin 606(18) may couple the consolidated port control IC 502 to ground. Pins 606(19)-606(23) may couple the optional battery pack 600 to a battery control and battery monitoring circuit 612. Voltage conditioning circuitry 614 may couple pins 606(25)-606(27) to the PMIC 506, with a battery pin 606(28) also coupled to the PMIC 506.

Also illustrated are a USB battery controller circuit 616, a USB Type-C CC logic circuit 618, a Vconn switch circuit 620, a USB PD PHY circuit 622, a fast charging circuit 624, and a Type-C Water detection circuit 626.

In the event that a particular function is not readily apparent from the above description, the consolidated port control IC 502 may detect source type, negotiate power levels, control and/or limit power transfers, and provide protection through thermal control, over-voltage protection, over-current protection, and moisture detection. Further, the LED pins 606(11)-606(14) may instead merely provide signals or communication to the SOC 508 or the PMIC 506 about whether power is present, a battery is present, battery level, errors, status reports, power levels, system throttling, or the like. The SOC 508 or the PMIC 506 may perform a system reset, control the system, enable functions, or the like. The thermal signals may monitor thermal levels at different parts of the system and use reported temperatures to reduce power/increase power, stop power, or the like. The ADC may measure power consumption, input power, or other analog signals. The SBU may be used for a displayport signal or the like.

Flowcharts illustrating exemplary processes associated with the hardware described above are provided with reference to FIGS. 7A and 7B. In particular, FIG. 7A illustrates a process 700 that occurs at connector insertion for a single-port device and FIG. 7B illustrates a process 750 that occurs at connector insertion for a multi-port device.

Figure 7A:
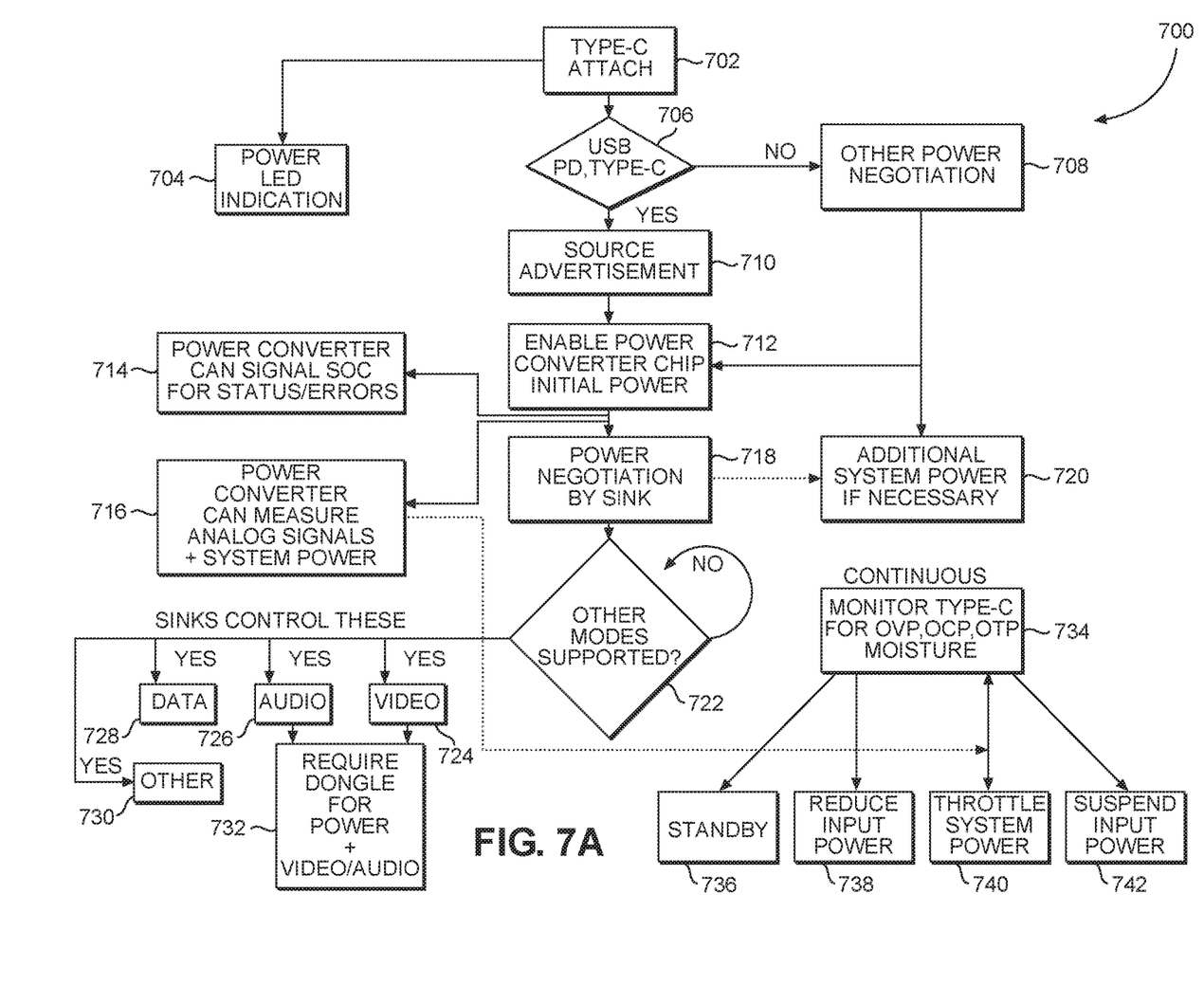
FIG. 7A is a flowchart showing a process associated with controlling a single USB Type-C port in a system.
Figure 7B:
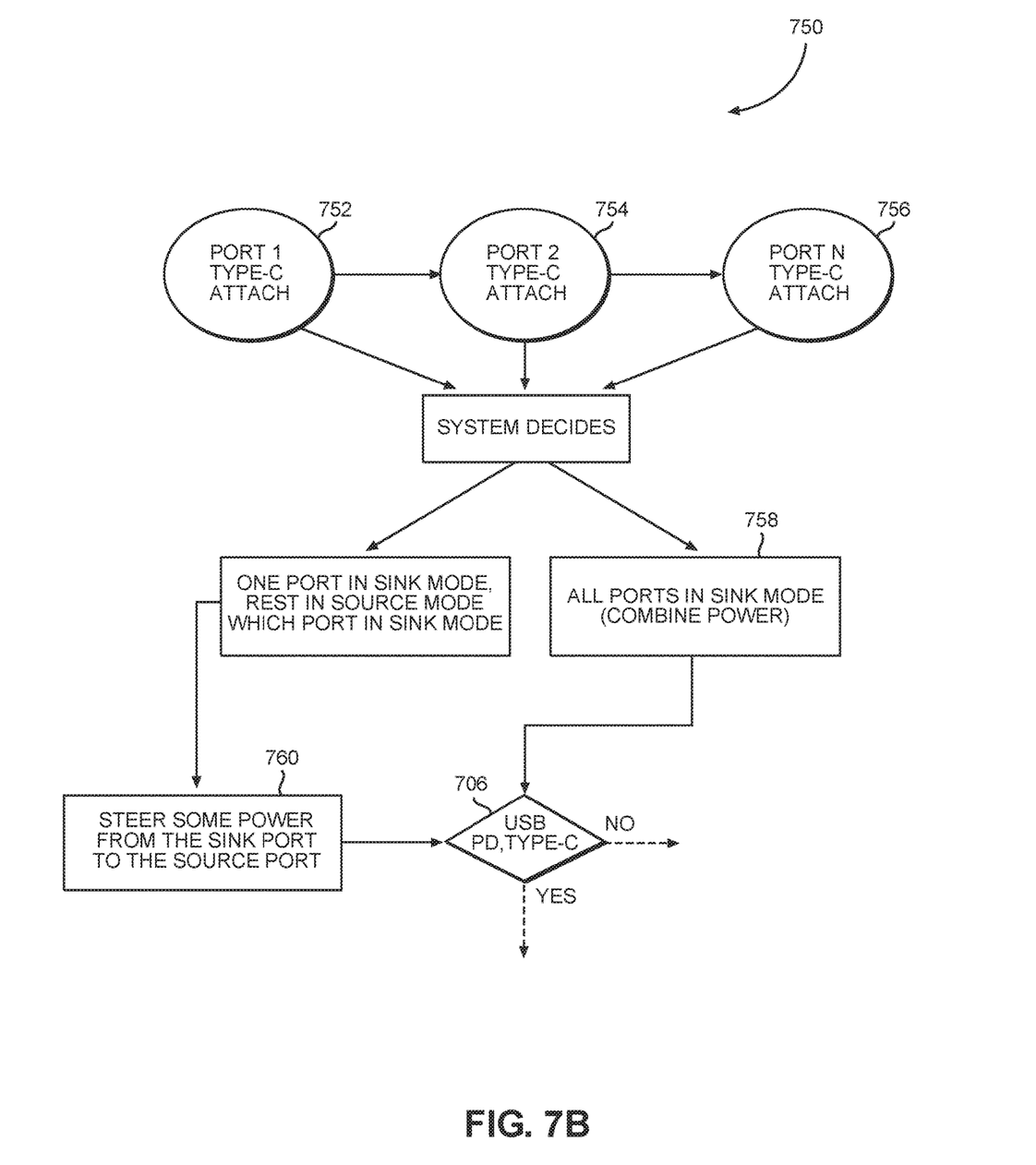
FIG. 7B is a flowchart showing a process associated with controlling multiple USB Type-C ports in a system.

In this regard, with reference to FIG. 7A, process 700 begins when a Type-C connector is attached to a receptacle in the device (block 702). This causes a power LED indication to illuminate (block 704). Further, the circuitry in the consolidated port IC detects power source type (e.g., USB Power Delivery (PD) or other source) (block 706). If the answer is no at block 706, other power negotiation begins (which may have some form of source advertisement based on some other proprietary format) (block 708). If, however, the answer is yes at block 706, then the device makes a source advertisement (block 710). In either event, a power converter chip is enabled for initial power levels (block 712). The power converter chip may signal the SOC for status/errors (block 714) and can measure analog signals and system power (block 716). Meanwhile, the sink begins power negotiation (block 718), which may result in additional system power being generated if necessary (block 720).

With continued reference to FIG. 7A, the control system circuitry monitors the connection to determine if other modes are supported (block 722). As long as the answer is no, and there is no removal of the connection, the control system circuitry continues to monitor the connection. Once the sink indicates that another mode is supported, the sink may control video (block 724), audio (block 726), data (block 728), or other mode (block 730). Optionally, a dongle may be required for power and audio/video (block 732).

Note that the device may continuously monitor the connection for over-voltage protection (OVP), over current protection (OCP), over temperature protection (OTP), and moisture (block 734) and may put the device in a standby mode (block 736), reduce power input (block 738), throttle system power (block 740) or suspend input power (block 742) as needed or desired.

FIG. 7B illustrates a process 750 for a multi-port device. In most regards, the process 750 duplicates the process 700, and such duplicative steps are not repeated. However, the control system also monitors which receptacles and associated ports are connected. In this regard, the control system determines if a first port is attached (block 752). If the answer is no, then the control system checks to see if a second port is attached (block 754) and so on until an Nth port is attached (block 756).

Based on the ports that are attached, the control system determines whether the ports are in sink or source mode. If all the ports are in sink mode, then power is combined (block 758). If one port is in sink mode and the rest are in source mode, the process 750 continues from block 706 and the device steers power from the sink port to the source port(s) (block 760).

The systems and methods for port management according to aspects disclosed herein may be provided in or integrated into any processor-based device. Examples, without limitation, include the computing devices 100 of FIG. 1 or 500 of FIG. 5 which may be a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
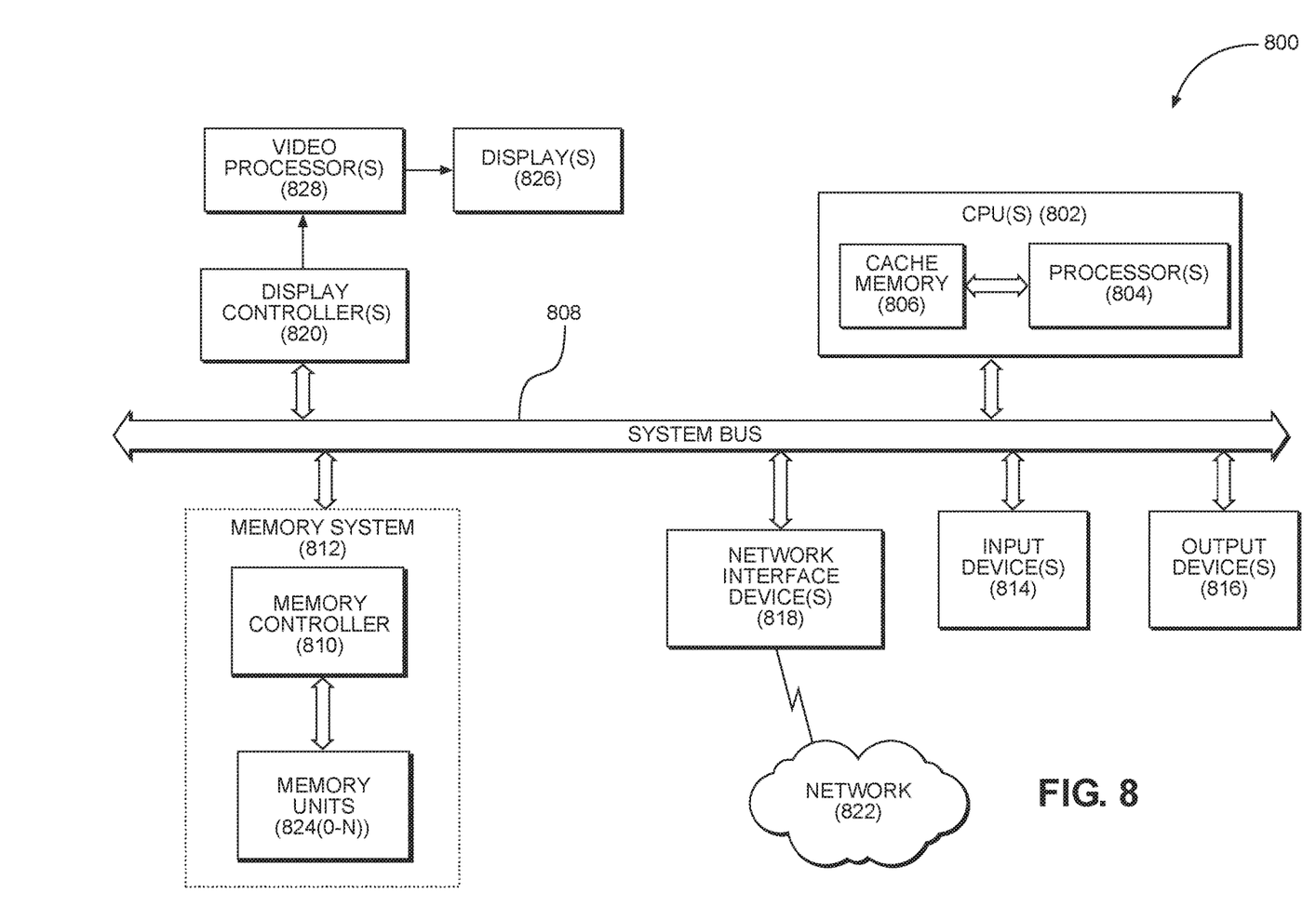
FIG. 8 is a block diagram of an exemplary processor-based system that can include the consolidated ICs of FIGS. 5 and 6.

In this regard, FIG. 8 illustrates an example of a processor-based system 800 that can employ the consolidated port control IC 502 illustrated in FIGS. 5 and 6. In this example, the processor-based system 800 includes one or more central processing units (CPUs) 802, each including one or more processors 804. The CPU(s) 802 may have cache memory 806 coupled to the processor(s) 804 for rapid access to temporarily stored data. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. Although not illustrated in FIG. 8, multiple system buses 808 could be provided, wherein each system bus 808 constitutes a different fabric.

Other master and slave devices can be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including, but not limited to, input keys, switches, voice processors, etc. The output device(s) 816 can include any type of output device, including, but not limited to, audio, video, other visual indicators, etc. The network interface device(s) 818 can be any devices configured to allow exchange of data to and from a network 822. The network 822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 can include one or more memory units 824(0-N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, an LED display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of controlling power for a device, comprising:
    detecting insertion of a connector into a first Universal Serial Bus (USB) Type-C receptacle;
    detecting insertion of a second connector into a second USB Type-C receptacle;
    determining if power is available through the first USB Type-C receptacle or if power is being drawn through the first USB Type-C receptacle;
    determining if power is available through the second USB Type-C receptacle;
    negotiating power levels if power is available;
    when power is available through the first USB Type-C receptacle and power is available through the second USB Type-C receptacle, combining power from both of the USB Type-C receptacles;
    when power is available from the second USB Type-C receptacle and power is being drawn through the first USB Type-C receptacle, routing at least some power between the USB Type-C receptacles;
    determining if other modes are supported through the USB Type-C receptacles wherein any such other mode is selected from the group consisting of: video, audio, and data; and
    controlling such other modes if available.

2. The method of claim 1, further comprising illuminating a light emitting diode (LED) on insertion detection.

3. The method of claim 1, further comprising illuminating a light emitting diode (LED) when there is a fault.

4. The method of claim 1, further comprising illuminating a light emitting diode (LED) when there is insufficient power.

5. A device comprising:
    a first Universal Serial Bus (USB) Type-C receptacle;
    a second USB Type-C receptacle; and
    a USB port control integrated circuit (IC), comprising circuitry configured to:
        detect insertion of a connector into the first USB Type-C receptacle;
        detect insertion of a second connector into the second USB Type-C receptacle;
        determine if power is available through the first USB Type-C receptacle or if power is being drawn through the first USB Type-C receptacle;
        determine if power is available through the second USB Type-C receptacle;
        negotiate power levels if power is available;

when power is available through the first USB Type-C receptacle and power is available through the second USB Type-C receptacle, combine power from both of the USB Type-C receptacles;
when power is available from the second USB Type-C receptacle and power is being drawn through the first USB Type-C receptacle, route at least some power between the USB Type-C receptacles;
determine if other modes are supported through the USB Type-C receptacles wherein any such other mode is selected from the group consisting of: video, audio, and data; and
control such other modes if available.

6. The device of claim 5, further comprising a light emitting diode (LED) configured to illuminate on insertion detection.

7. The device of claim 5, further comprising a light emitting diode (LED) configured to illuminate on detection of a fault.

8. The device of claim 5, further comprising a light emitting diode (LED) configured to illuminate on detection of insufficient power supply.

9. The device of claim 5 selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *